(12) United States Patent
Kim et al.

(10) Patent No.: US 12,011,780 B2
(45) Date of Patent: Jun. 18, 2024

(54) WELDING APPARATUS HAVING FUME REMOVAL FUNCTION

(71) Applicant: LG Energy Solution, Ltd., Seoul (KR)

(72) Inventors: Jun Soo Kim, Daejeon (KR); Young Soo Song, Daejeon (KR); Chun Hong Park, Daejeon (KR); Ye Hoon Im, Daejeon (KR); Sung Tae Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 239 days.

(21) Appl. No.: 17/623,782

(22) PCT Filed: Jul. 1, 2020

(86) PCT No.: PCT/KR2020/008601
§ 371 (c)(1),
(2) Date: Dec. 29, 2021

(87) PCT Pub. No.: WO2021/006534
PCT Pub. Date: Jan. 14, 2021

(65) Prior Publication Data
US 2022/0241896 A1    Aug. 4, 2022

(30) Foreign Application Priority Data
Jul. 5, 2019    (KR) .................... 10-2019-0081149

(51) Int. Cl.
*B23K 26/16*    (2006.01)
*B08B 15/02*    (2006.01)
*B08B 15/04*    (2006.01)
*B23K 26/08*    (2014.01)
*B23K 101/36*    (2006.01)

(52) U.S. Cl.
CPC .............. *B23K 26/16* (2013.01); *B08B 15/02* (2013.01); *B08B 15/04* (2013.01); *B23K 26/0838* (2013.01); *B23K 2101/36* (2018.08)

(58) Field of Classification Search
None
See application file for complete search history.

(56) References Cited

U.S. PATENT DOCUMENTS 3,761,675 A * 9/1973 Mason ...................... B26F 3/16
                                                  700/134
5,585,015 A * 12/1996 Hayashi ............... B23K 26/702
                                                  219/121.72

(Continued)

FOREIGN PATENT DOCUMENTS

JP    H07051869 A    2/1995
JP    2902571 B2    6/1999

(Continued)

OTHER PUBLICATIONS

Search report from International Application No. PCT/KR2020/008601, mailed Sep. 28, 2020.

(Continued)

*Primary Examiner* — Joseph A Dillon, Jr.
(74) *Attorney, Agent, or Firm* — Lerner David LLP (57) ABSTRACT

Provided is a welding apparatus having a fume elimination function. The welding apparatus efficiently eliminates fume generated while a welding object is being welded using a laser.

8 Claims, 6 Drawing Sheets

(56) References Cited

U.S. PATENT DOCUMENTS

| | | | | |
|---|---|---|---|---|
| 6,507,000 | B2* | 1/2003 | Otsubo | B23K 26/1462 |
| | | | | 219/121.7 |
| 11,107,495 | B2* | 8/2021 | Clark | B23K 26/127 |
| 2006/0124616 | A1* | 6/2006 | Hsu | B23K 26/032 |
| | | | | 219/121.72 |
| 2008/0302770 | A1* | 12/2008 | Traverso | H01L 21/67092 |
| | | | | 219/121.68 |
| 2013/0334739 | A1* | 12/2013 | Miller | B23K 26/702 |
| | | | | 425/142 |
| 2018/0257175 | A1* | 9/2018 | Lee | B23K 26/22 |
| 2019/0105738 | A1* | 4/2019 | Dallan | B23K 26/702 |
| 2019/0283181 | A1* | 9/2019 | Beransky | B23K 37/0408 |
| 2020/0246913 | A1* | 8/2020 | Sartin | B23K 26/142 |
| 2020/0298338 | A1* | 9/2020 | Reisacher | B23K 26/16 |
| 2021/0129265 | A1* | 5/2021 | Nomaru | H01L 21/6704 |
| 2021/0220945 | A1* | 7/2021 | Choi | B23K 26/0738 |
| 2021/0268604 | A1* | 9/2021 | Tokuichi | B23K 37/0408 |
| 2021/0308799 | A1* | 10/2021 | Funaoka | B23K 26/1464 |
| 2021/0346985 | A1* | 11/2021 | Neufeld | B23K 26/0853 |

FOREIGN PATENT DOCUMENTS

| | | |
|---|---|---|
| JP | 2013141669 A | 7/2013 |
| JP | 5779152 B2 | 9/2015 |
| KR | 100524253 B1 | 10/2005 |
| KR | 100660221 B1 | 12/2006 |
| KR | 100761737 B1 | 9/2007 |
| KR | 100846840 B1 | 7/2008 |
| KR | 20110093163 A | 8/2011 |
| KR | 20130070392 A | 6/2013 |
| KR | 101882232 B1 | 7/2018 |
| WO | 2010081619 A1 | 7/2010 |

OTHER PUBLICATIONS

Extended European Search Report for Application No. 20836764.9 dated Aug. 10, 2022. 8 pgs.

* cited by examiner

WELDING APPARATUS HAVING FUME REMOVAL FUNCTION

CROSS-REFERENCE TO RELATED APPLICATIONS

The present application is a national phase entry under 35 U.S.C. § 371 of International Application No. PCT/KR2020/008601, filed Jul. 1, 2020, which claims priority from Korean Application No. 10-2019-0081149, filed Jul. 5, 2019, all of which are hereby incorporated by reference herein.

TECHNICAL FIELD

The present disclosure relates to a welding apparatus having a fume elimination function, and more particularly, to a welding apparatus having a fume elimination function, the welding apparatus being able to efficiently eliminate fume generated while a welding object (i.e. an object to be welded) is being welded using a laser.

BACKGROUND ART

In general, in a battery fabrication process, an operation of welding a portion of a welding object, e.g., a tab portion provided on a distal end of a battery, using a laser welding apparatus is performed.

In this case, the laser welding apparatus is provided with a separate fume elimination apparatus (i.e., a suction apparatus) able to eliminate fume, such as smoke, steam, or vapor, generated during laser welding, and such a fume elimination apparatus was previously filed as, for example, Korean Patent Application Publication No. 10-2010-0103130 (published on Sep. 27, 2010).

Specifically, the fume elimination apparatus of the related art has the shape of a hood disposed to cover at least the entire upper portion of a welding apparatus. The hood serves to draw fume generated during welding using vacuum and discharge the fume to the outside.

However, although a high vacuum pressure, i.e., a high flow rate, for drawing fume may be formed in the vicinity of a suction nozzle of the hood, air current having a low flow rate is inevitably formed in the vicinity of a welding portion, spaced apart a predetermined distance from the suction nozzle, due to the structure of the hood.

It may be difficult for such a fume elimination apparatus of the related art as described above to rapidly and efficiently eliminate fume generated from the welding portion due to low dust collection efficiency. Thus, there is a risk that the generated welding fume may spread to the surroundings of the welding portion, thereby contaminating a product and the surroundings.

DISCLOSURE

Technical Problem

The present disclosure has been made to solve the above problems, and an object of the present disclosure is to propose a welding apparatus having a fume elimination function, the welding apparatus being able to rapidly and efficiently eliminate fume generated while a welding object is being welded using a laser.

Technical Solution

As an embodiment of the present disclosure, provided is a welding apparatus including: a body including a stage on which a welding object is placed; a lighting unit emitting light to the welding object so that a welding portion of the welding object placed on the stage is accurately recognizable; a welding unit provided on the body to weld the welding object placed on the stage; and a fume elimination unit including suction nozzles disposed on at least both sides of the welding portion and configured to draw and discharge fume generated during welding of the welding object.

In this case, the stage may include a conveyor belt rotating in one direction by receiving power so that a plurality of welding objects are able to be sequentially welded while being moved in one direction.

In addition, the lighting unit may include a pair of lighting units disposed on at least both sides of the welding object so as to face each other.

In addition, the lighting unit and the suction nozzles may be disposed so as to be integrally movable up and down by an actuator in order to be prevented from interrupting the welding object when the welding object is moved by the conveyor belt.

In addition, the suction nozzles may be disposed above the lighting unit in order to prevent a decrease in an amount of light, emitted from the lighting units toward the welding object, which may occur when the lighting units are covered by the suction nozzles.

In addition, the fume elimination unit may further include a hood disposed above the welding object.

In addition, a blocking plate may be further provided in an inlet of the hood, the blocking plate being configured to create air current on both sides of an interior of the hood.

Advantageous Effects

The present disclosure having the above-described configuration is advantageous in that fume generated during welding may be rapidly and efficiently eliminated by the suction nozzles disposed on both sides of a welding portion of a welding object.

DESCRIPTION OF THE REFERENCE NUMERALS IN THE DRAWINGS

| | |
|---|---|
| 100: welding apparatus | 110: body |
| 111: stage | 120: lighting unit |
| 130: welding unit | 131: hole |
| 133: laser beam | 140: fume elimination unit |
| 141: suction nozzle | 143: hood |
| 145: inlet | |
| 145a: first fume collection passage | |
| 145b: second fume collection passage | |
| 147: blocking plate | |
| M: welding object | M1: welding portion |

Mode for Invention

Hereinafter, a configuration and an operation of a specific embodiment of the present disclosure will be described in detail with reference to the accompanying drawings.

Herein, in designating elements of the drawings by reference numerals, the same elements will be designated by the same reference numerals, if possible, although they are shown in different drawings.

Figure 1:
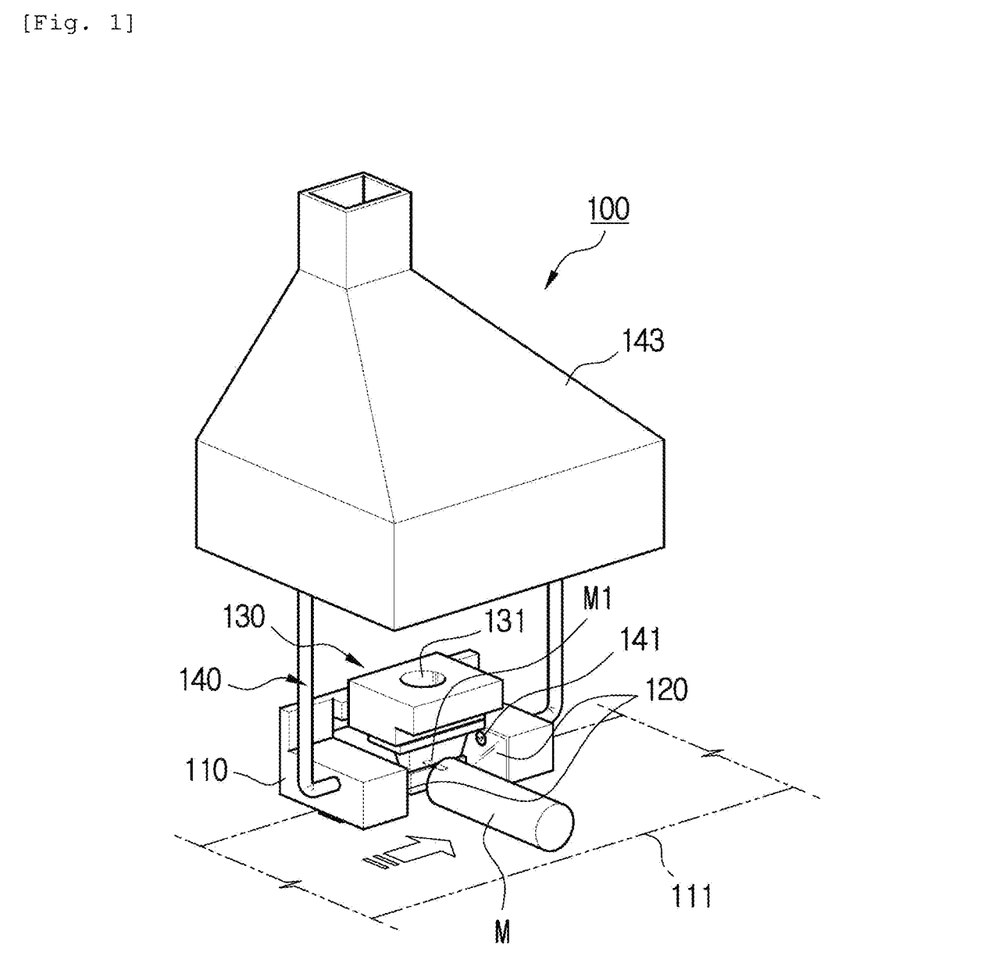
FIG. 1 is a perspective view illustrating a welding apparatus having a fume elimination function according to the present disclosure.
Figure 2:
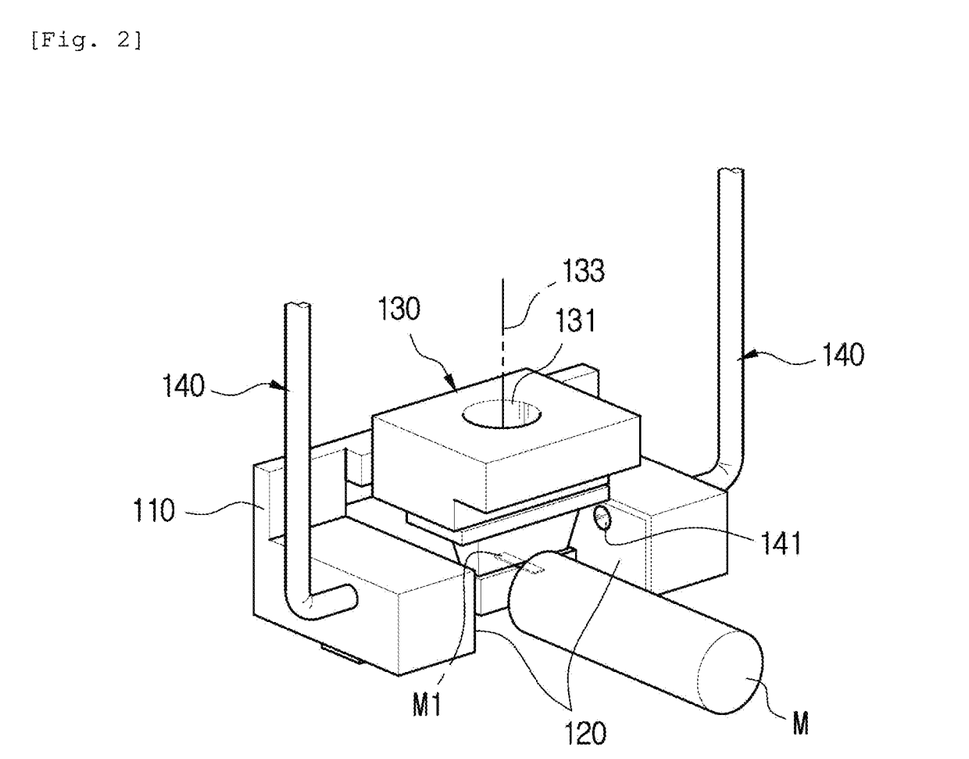
FIG. 2 is a perspective view illustrating key portions of the welding apparatus having a fume elimination function according to the present disclosure.

FIG. 1 is a perspective view illustrating a welding apparatus having a fume elimination function according to the present disclosure, and FIG. 2 is a perspective view illustrating key portions of the welding apparatus having a fume elimination function according to the present disclosure.

Referring to FIGS. 1 and 2, a welding apparatus 100 having a fume elimination function according to the present disclosure may include a body 110, lighting units 120, a welding unit 130, and a fume elimination unit 140.

Hereinafter, the configuration of the present disclosure will be described in detail.

The body 110 forms a main frame of the welding apparatus 100 having a fume elimination function. The body 110 may be provided with a stage 111 on which a welding object M (i.e. an object to be welded) is to be placed.

Specifically, the stage 111 may be provided as a fixed type, but in the present disclosure, the stage 111 may be implemented as a conveyor belt rotating in one direction by receiving power from a motor (not shown) so that a plurality of welding objects M may be sequentially welded while being moved in one direction (i.e., the direction of an arrow in FIG. 1).

Hereinafter, in the present disclosure, a case in which the stage 111 is implemented as a conveyor belt will be described as an example. However, the present disclosure is not limited thereto.

The lighting units 120 may emit light toward the welding object M in order to improve the recognition rate of the accurate location of a welding portion M1, e.g., a tab provided on a distal end, of the welding object M placed on the stage 111.

Specifically, a pair of lighting units 120 may be provided on at least both sides of the welding object M with respect to the longitudinal direction of the welding object M such that the lighting units 120 are spaced apart from and face each other.

In addition, the lighting units 120 may be disposed to be movable up and down using an actuator (not shown) in order to prevent the movement of the welding object M on the conveyor belt from being interrupted.

In this case, in the present disclosure, a case in which the lighting units 120 are disposed to be movable up and down in order to prevent the welding object M from being interrupted while being moved has been described as an example. However, the present disclosure is not limited thereto. This configuration of the present disclosure may be modified to a structure in which the lighting units 120 are coupled integrally with the welding unit 130 to be described later, such that the lighting units 120 and the welding unit 130 are disposed to be movable up and down together.

That is, when the welding object M moves on the stage 111 in one direction, the lighting units 120 having the above-described configuration may move upward and away from the welding object M in order to prevent interruption with the welding object M. After the welding object M is stopped at a predetermined position for welding, the lighting units 120 may move downward in order to emit light to the welding portion M1 during welding.

The welding unit 130 is provided above the body 110. The welding unit 130 may weld the welding object M, placed on the stage 111, by projecting a laser beam 133 through a hole 131 extending in the top-bottom direction.

Figure 3:
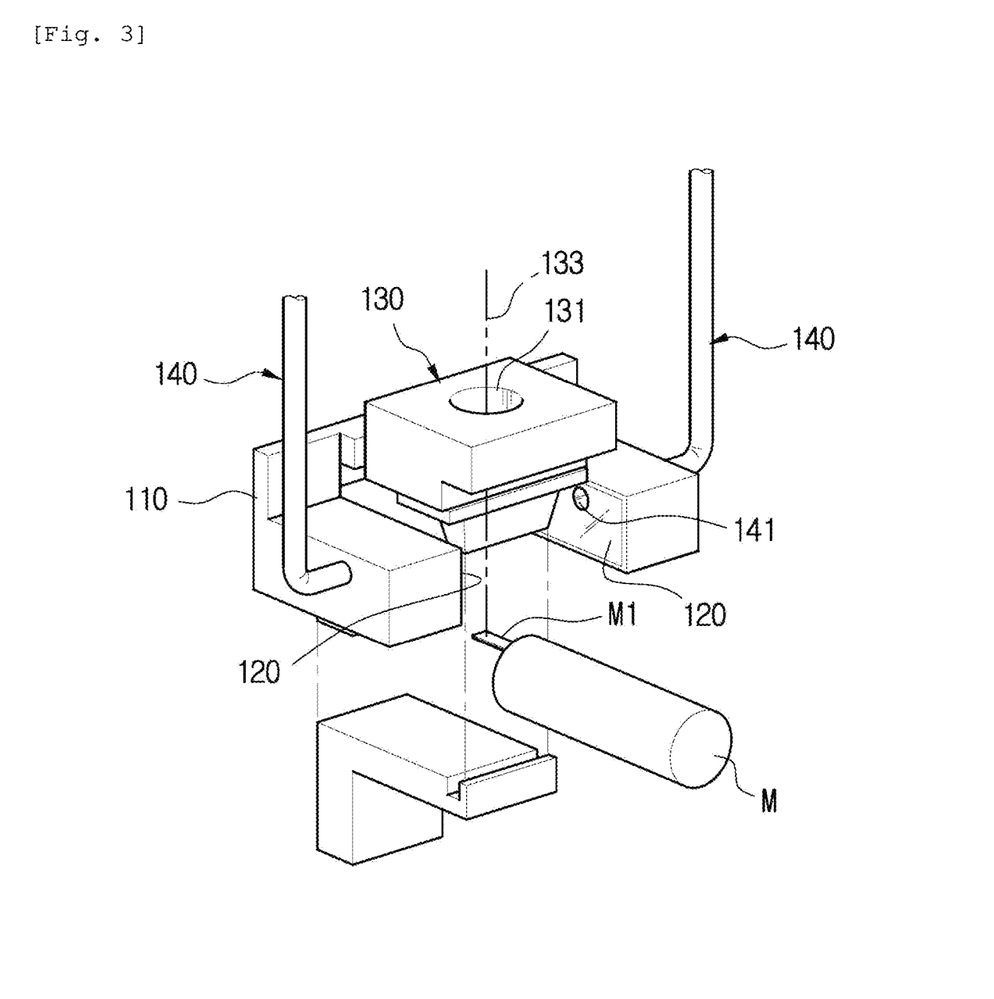
FIG. 3 is an exploded perspective view of FIG. 2.

Specifically, referring to FIG. 3, the welding unit 130 may weld the welding portion M1 of the welding object M, e.g., the tab provided on one end of a battery (i.e. the welding object M) in the longitudinal direction of the battery, using the laser beam 133. A description of specific operation principle of a welder using a laser beam will be omitted, since the welder using a laser beam is a publicly-known technology.

In this case, the welding unit 130 may include a detector (not shown) able to accurately detect the location of the welding portion M1 when the welding object M is brightly illuminated by the lighting units 120. The detector may be implemented as a detection sensor. Since the technology for recognizing the accurate location of the welding portion M1 using the detector as described above is a publicly-known technology, a detailed description thereof will be omitted.

The fume elimination unit 140 is configured to rapidly draw and discharge welding fume generated during the welding of the welding object M. The fume elimination unit 140 may be disposed adjacent to at least both sides of the welding object M.

Figure 4:
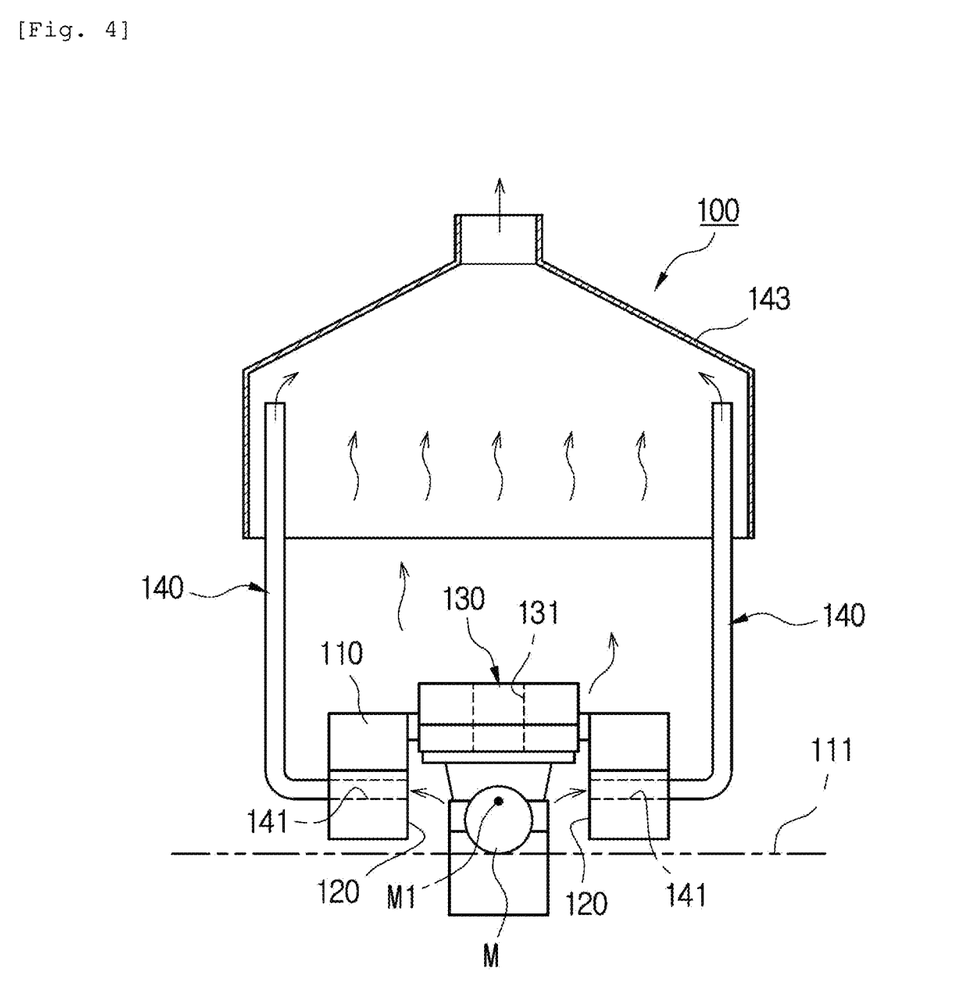
FIG. 4 is a front cross-sectional view illustrating an operating state of the welding apparatus having a fume elimination function according to the present disclosure.

Specifically, referring to FIG. 4, the fume elimination unit 140 may include suction nozzles 141 provided on at least both sides of the welding object M so as to be spaced apart therefrom.

In addition, a hood 143 may be disposed above the welding object M. The remaining amount of fume moving upward on air current, instead of being eliminated through the suction nozzles 141, may be eliminated by the hood 143.

In this case, the suction nozzles 141 may be integrally provided so as to extend through the lighting units 120, respectively. The suction nozzles 141 may be disposed above the lighting units 120, respectively, in order to prevent a decrease in the amount of light emitted from the lighting units 120 toward the welding object M, which may occur when the lighting units 120 are covered by the suction nozzles 141.

That is, since the fume generated during the welding of the welding object M generally moves upward, the suction nozzles 141 may be disposed above the lighting units 120, respectively, so as to efficiently draw the fume generated during the welding of the welding object M.

The suction nozzles 141 may be connected to the hood 143. Thus, the fume, drawn through the suction nozzles 141, may be upwardly directed and then discharged to an external duct (not shown) through the hood 143.

The welding apparatus 100 having a fume elimination function according to the present disclosure, configured as described above, may rapidly and efficiently eliminate welding fume generated during the welding of the welding object M using a laser.

Figure 5:
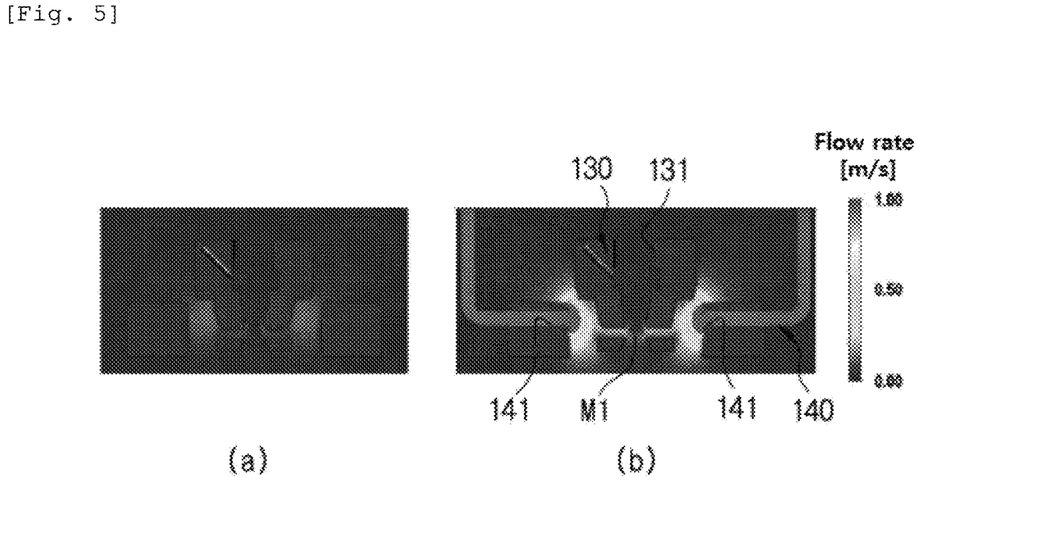
FIGS. 5 and 6 are views illustrating simulation data regarding the performance of the welding apparatus having a fume elimination function according to the present disclosure.

Specifically, as illustrated in FIG. 5(*a*), it may be appreciated that a welding apparatus of the related art has a low flow rate around the welding portion M1 and thus fume generated during welding is not properly discharged.

In contrast, as illustrated in FIG. 5(*b*), it may be appreciated that the present disclosure may have a high flow rate around the welding portion M1 due to the suction nozzles 141 provided on both sides of the welding portion M1 and thus may eliminate fume generated from the welding portion M1 during welding by directly drawing and discharging the fume.

Figure 6:
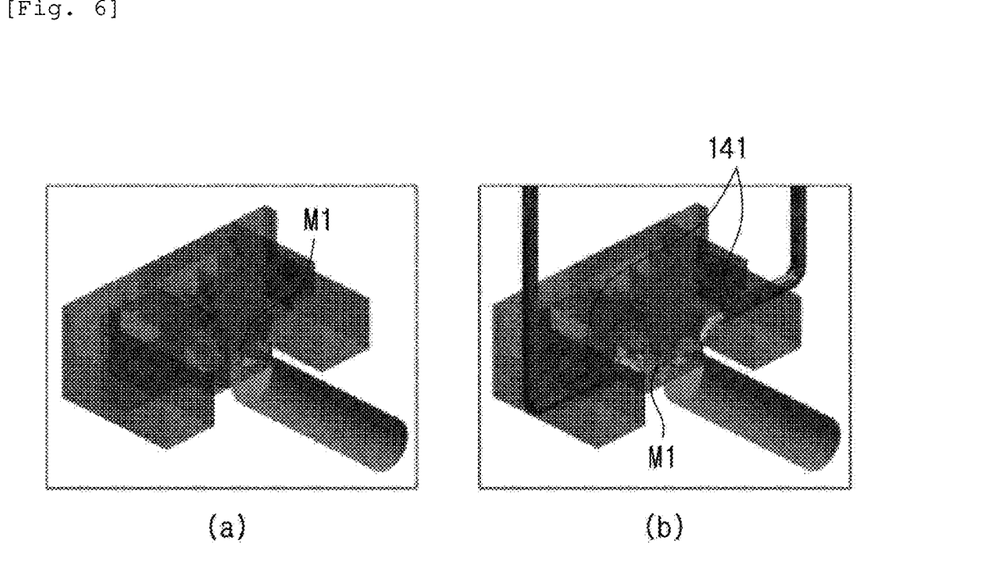

In addition, as illustrated in FIG. 6(*a*), in the welding apparatus of the related art, fume generated during welding may be congested and accumulated in the vicinity of the welding portion M1 due to the limited influence of air current that draws fume during welding and thus the tab, i.e. the welding portion M1, may be contaminated.

In contrast, it may be appreciated that, in the present disclosure, as illustrated in FIG. 6(*b*), fume generated during welding is rapidly collected through the suction nozzles 141 disposed on both sides of the welding object, instead of spreading to the surroundings. Thus, it is possible to prevent the tab, i.e. the welding portion M1, from being contaminated by the generated fume.

Figure 7:
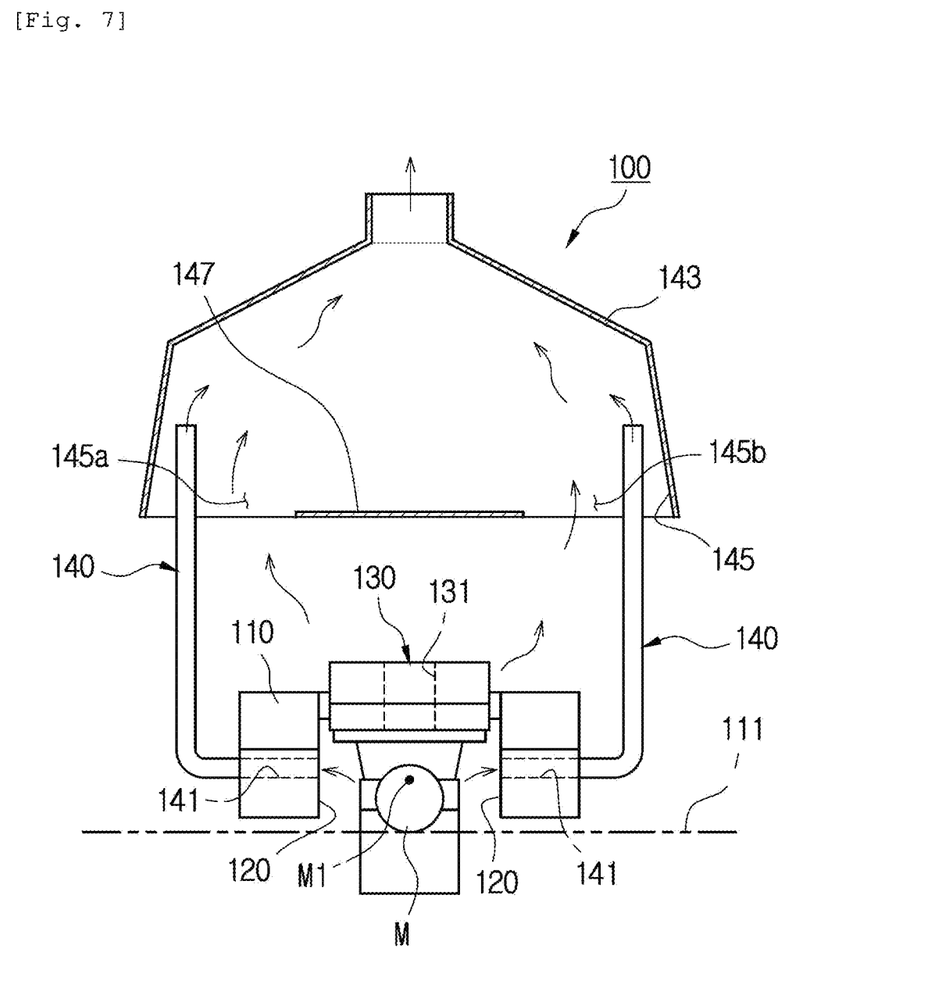
FIG. 7 is a side cross-sectional view illustrating an embodiment in which a blocking plate is provided to create air current on both sides of the interior of a hood according to the present disclosure.

In addition, as illustrated in FIG. 7, a blocking plate 147 may be provided in an inlet 145 of the hood 143 in order to generate air current on both sides of the interior of the hood 143. That is, the structure of the blocking plate 147 provided in the central portion of the inlet 145 may define a first fume collection passage 145*a* and a second fume collection passage 145*b* on both sides of the inlet 145. Accordingly, the fume, generated from the welding unit 130, may be directly drawn through the first fume collection passage 145*a* and the second fume collection passage 145*b* provided on both sides of the hood 143, without passing through the welding portion M1, and then be discharged to the outside.

In this case, although a case in which the hood 143 including the blocking plate 147 is applied together with the fume elimination unit 140 including the suction nozzles 141 has been illustrated in and described with reference to FIG. 7, the present disclosure is not limited thereto. That is, the hood 143 including the blocking plate 147 may also be applied to the welding apparatus 100 not including the fume elimination unit 140.

Although exemplary embodiments of the disclosure have been disclosed for illustrative purposes, those skilled in the art will appreciate that the present disclosure is not limited to the foregoing embodiments and various changes and modifications are possible, without departing from the technical spirit of the disclosure.

The invention claimed is:

1. A welding apparatus comprising:
a body comprising a stage configured to receive a welding object placed thereon;
a lighting unit configured to emit light onto the welding object so that a welding portion of the welding object placed on the stage is accurately recognizable;
a welding unit provided on the body and configured to weld the welding object placed on the stage; and
a fume elimination unit comprising suction nozzles disposed on at least two opposite sides of the welding portion and configured to draw and discharge fume generated during welding of the welding object,
wherein the suction nozzles are disposed above the lighting unit out of a travel path of light emitted from the lighting unit toward the welding object.

2. The welding apparatus of claim 1, wherein the stage comprises a powered conveyor belt configured to rotate in a first direction so that a plurality of additional welding objects are able to be sequentially welded after being moved in the first direction.

3. The welding apparatus of claim 1, wherein the lighting unit comprises a pair of lighting units disposed on at least two opposite sides of the welding object, the pair of lighting units facing each other.

4. The welding apparatus of claim 2, wherein the lighting unit and the suction nozzles are together movable up and down by an actuator out of a travel path of the welding object when the welding object is moved in the first direction by the conveyor belt.

5. The welding apparatus of claim 1, wherein the fume elimination unit further comprises a hood disposed above the stage that is configured to receive the welding object placed thereon.

6. A welding apparatus, comprising:
a body comprising a stage configured to receive a welding object placed thereon;
a lighting unit configured to emit light onto the welding object so that a welding portion of the welding object placed on the stage is accurately recognizable;
a welding unit provided on the body and configured to weld the welding object placed on the stage;
a fume elimination unit comprising suction nozzles disposed on at least two opposite sides of the welding portion and configured to draw and discharge fume generated during welding of the welding object, the fume elimination unit further comprising a hood disposed above the stage that is configured to receive the welding object placed thereon; and
a blocking plate provided in an inlet of the hood, the blocking plate and an interior surface of the hood together being configured to create air current through the inlet on two opposite sides of the interior surface of the hood.

7. A welding apparatus comprising:
a body comprising a stage configured to receive a welding object placed thereon;
a lighting unit configured to emit light onto the welding object so that a welding portion of the welding object placed on the stage is accurately recognizable;
a welding unit provided on the body and configured to weld the welding object placed on the stage; and
a fume elimination unit comprising suction nozzles disposed on at least two opposite sides of the welding portion and configured to draw and discharge fume generated during welding of the welding object,
wherein the suction nozzles extend through the lighting unit.

8. The welding apparatus of claim 7, wherein the lighting unit comprises a pair of lighting units disposed on at least two opposite sides of the welding object, the pair of lighting units facing each other, the suction nozzles respectively extending through the pair of lighting units.

* * * * *